(12) United States Patent
Yamauchi et al.

(10) Patent No.: US 8,248,648 B2
(45) Date of Patent: Aug. 21, 2012

(54) LOGGING HISTORY OF IMAGE DATA DEPENDENT ON IMAGE PROCESSING FUNCTION AND PRIORITY

(75) Inventors: Tomonari Yamauchi, Kanagawa (JP); Toshiaki Arai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1053 days.

(21) Appl. No.: 11/734,927

(22) Filed: Apr. 13, 2007

(65) Prior Publication Data

US 2008/0162567 A1     Jul. 3, 2008

(30) Foreign Application Priority Data

Dec. 27, 2006  (JP) ................................. 2006-351887

(51) Int. Cl.
*G06K 15/00*      (2006.01)
(52) U.S. Cl. ...................................... 358/1.16
(58) Field of Classification Search .............. 358/1.14, 358/1.15, 1.16
See application file for complete search history.

(56) References Cited

U.S. PATENT DOCUMENTS

| | | | |
|---|---|---|---|
| 5,872,638 A * | 2/1999 | Haze | 358/405 |
| 2002/0089937 A1 * | 7/2002 | Venkatachary et al. | 370/255 |
| 2006/0082837 A1 | 4/2006 | Hiroe et al. | |
| 2007/0133054 A1 * | 6/2007 | Kobayashi et al. | 358/1.16 |

FOREIGN PATENT DOCUMENTS

| | | |
|---|---|---|
| JP | 2004-280169 | 10/2004 |
| JP | 2006-121347 | 5/2006 |

OTHER PUBLICATIONS

Machine translation of JP 2004-280169 to Ota.*

* cited by examiner

*Primary Examiner* — Benny Q Tieu
*Assistant Examiner* — Eric A Rust
(74) *Attorney, Agent, or Firm* — Gesmer Updegrove LLP (57) ABSTRACT

There is provided an image log management apparatus. The apparatus includes a rule storage unit that stores a rule for determining whether or not a log image is recorded at a time when each processing operation is performed by one or more image-processing units according to a program in which a procedure for using the one or more image-processing units is described; an acceptance unit that accepts the program in which the procedure for using the one or more image-processing units is described; a program execution unit that executes the program accepted in the acceptance unit; and a log controller that, by reference to a rule applicable to each of the image-processing units used in the program, performs control as to whether or not a log image relating to execution of the program in the program execution unit is recorded.

18 Claims, 9 Drawing Sheets

| RULE ID | PRIORITY LEVEL | HISTORY LOGGING | FUNCTION DESCRIPTION |
|---|---|---|---|
| 1 | 5 | EXECUTED | `<FACSIMILE TRANSMISSION>`<br>`  <DESTINATION>0-*</DESTINATION>`<br>`</FACSIMILE TRANSMISSION>` |
| 2 | 3 | NOT EXECUTED | `<FACSIMILE TRANSMISSION>`<br>`  <DESTINATION>*</DESTINATION>`<br>`</FACSIMILE TRANSMISSION>` |
| 3 | 1 | EXECUTED | `<FACSIMILE TRANSMISSION/>` |
| 4 | 5 | EXECUTED | `<FILE SERVER>`<br>`  <REGISTRATION DESTINATION>server \\ fax-outbox</REGISTRATION DESTINATION>`<br>`</FILE SERVER>` |

Fig. 1

| RULE ID | PRIORITY LEVEL | HISTORY LOGGING | FUNCTION DESCRIPTION |
|---|---|---|---|
| 1 | 5 | EXECUTED | <FACSIMILE TRANSMISSION><br>  <DESTINATION>0-*</DESTINATION><br></FACSIMILE TRANSMISSION> |
| 2 | 3 | NOT EXECUTED | <FACSIMILE TRANSMISSION><br>  <DESTINATION>*</DESTINATION><br></FACSIMILE TRANSMISSION> |
| 3 | 1 | EXECUTED | <FACSIMILE TRANSMISSION/> |
| 4 | 5 | EXECUTED | <FILE SERVER><br>  <REGISTRATION DESTINATION>server\\fax-outbox</REGISTRATION DESTINATION><br></FILE SERVER> |

| FUNCTION TYPE | PROGRAM EXECUTION |
|---|---|
| PROGRAM NAME | XXXXXX |
| EXECUTION DATE AND TIME | YYYY-MM-DD HH:MM:SS |
| EXECUTION USER | XXXXX |

(b)

| FUNCTION TYPE | PROGRAM EXECUTION |
|---|---|
| PROGRAM NAME | XXXXXX |
| EXECUTION DATE AND TIME | YYYY-MM-DD HH:MM:SS |
| EXECUTION USER | XXXXX |
| FUNCTION TYPE | SCAN EXECUTION |
| READOUT MODE | MONOCHROME |
| READOUT SIZE | A4 |
| DOUBLE-SIDE READING | OFF |
| NUMBER OF READING SIDES | 2 |
| IMAGE INFORMATION | [READ IMAGE INFORMATION] |

Fig. 3

| | |
|---|---|
| FUNCTION TYPE | PROGRAM EXECUTION |
| PROGRAM NAME | XXXXXX |
| EXECUTION DATE AND TIME | YYYY-MM-DD HH:MM:SS |
| EXECUTION USER | XXXXX |
| EXECUTION TYPE | SCAN EXECUTION |
| READOUT MODE | MONOCHROME |
| READOUT SIZE | A4 |
| DOUBLE-SIDE READING | OFF |
| NUMBER OF READING SIDES | 2 |
| FUNCTION TYPE | FACSIMILE TRANSMISSION |
| TRANSMISSION DESTINATION | 0-03-1234-5678 |
| COMMUNICATION MODE | G3 |
| NUMBER OF SENDING SHEETS | 2 |
| COMMUNICATION TIME | 35 |
| NUMBER OF RETRIES | 0 |
| FUNCTION TYPE | FILE SERVER REGISTRATION |
| REGISTRATION DESTINATION | server\\fax-outbox |
| USER | server\user |
| FILE FORMAT | PDF |
| FILE NAME | XXXXXX-XXXXXX-XXX.pdf |
| FILE SIZE | XXXXX |
| IMAGE INFORMATION | [READ IMAGE INFORMATION] |

LOGGING HISTORY OF IMAGE DATA DEPENDENT ON IMAGE PROCESSING FUNCTION AND PRIORITY

CROSS-REFERENCE TO RELATED APPLICATIONS

This application is based on and claims priority under 35 USC 119 from Japanese Patent Application No. 2006-351887, filed on Dec. 27, 2006.

BACKGROUND

1. Technical Field

The present invention relates to an image log management apparatus, a recording medium, and a method for managing an image log.

2. Related Art

To prevent illegal operation, such as illegal document copying or illegal facsimile transmission, in an image processor such as a digital multifunction machine, it has been suggested that an image log including an image which is copied, transmitted, printed, or read by the image processor be generated and retained.

In a system for maintaining an image log, when an image-processing log is recorded with respect to all processing operations performed by an image processor, the amount of data becomes enormous, which might raise a problem of increased cost of storage or degraded searchability. In particular, in terms of searchability, because the image log might necessitate a manager to visually check images for judgment, a great number of image logs existing as a search target will cause serious degradation in search performance. To prevent such performance degradation, it is desired to narrow a log of images to be recorded.

Some image processors in which an image log is recorded can specify for each function, such as a printing function, a copying function, a scanning function, or a facsimile transmission function provided by the image processor, whether or not the image log is recorded during a processing operation performed using the function. Meanwhile, among recent image processors, there exists an image processor capable of performing a function configured to interpret a program in which a series of procedures for using various functions contained in the image processor or provided from an external server on a network are described, and to run the program on the image processor itself. The above-described types of programs may include a program in which there is described a procedure for scanning a paper document in an image processor and performing optical character recognition (OCR) on a scanned result in an external server. When execution of the program is instructed, the image processor causes a scanning unit mounted therein to scan a paper document, transmits a scanned image obtained as a result of the scanning to the external server, and causes the external serve to perform the OCR.

SUMMARY

According to an aspect of the invention, there is provided an image log management apparatus. The apparatus includes a rule storage unit that stores a rule for determining whether or not a log image is recorded at a time when each processing operation is performed by one or more image-processing units according to a program in which a procedure for using the one or more image-processing units is described; an acceptance unit that accepts the program in which the procedure for using the one or more image-processing units is described; a program execution unit that executes the program accepted in the acceptance unit; and a log controller that, by reference to a rule applicable to each of the image-processing units used in the program, performs control as to whether or not a log image relating to execution of the program in the program execution unit is recorded.

BRIEF DESCRIPTION OF THE DRAWINGS

Exemplary embodiments of the present invention will be described in detail by reference to the following figures, wherein.

DETAILED DESCRIPTION

Figure 1:
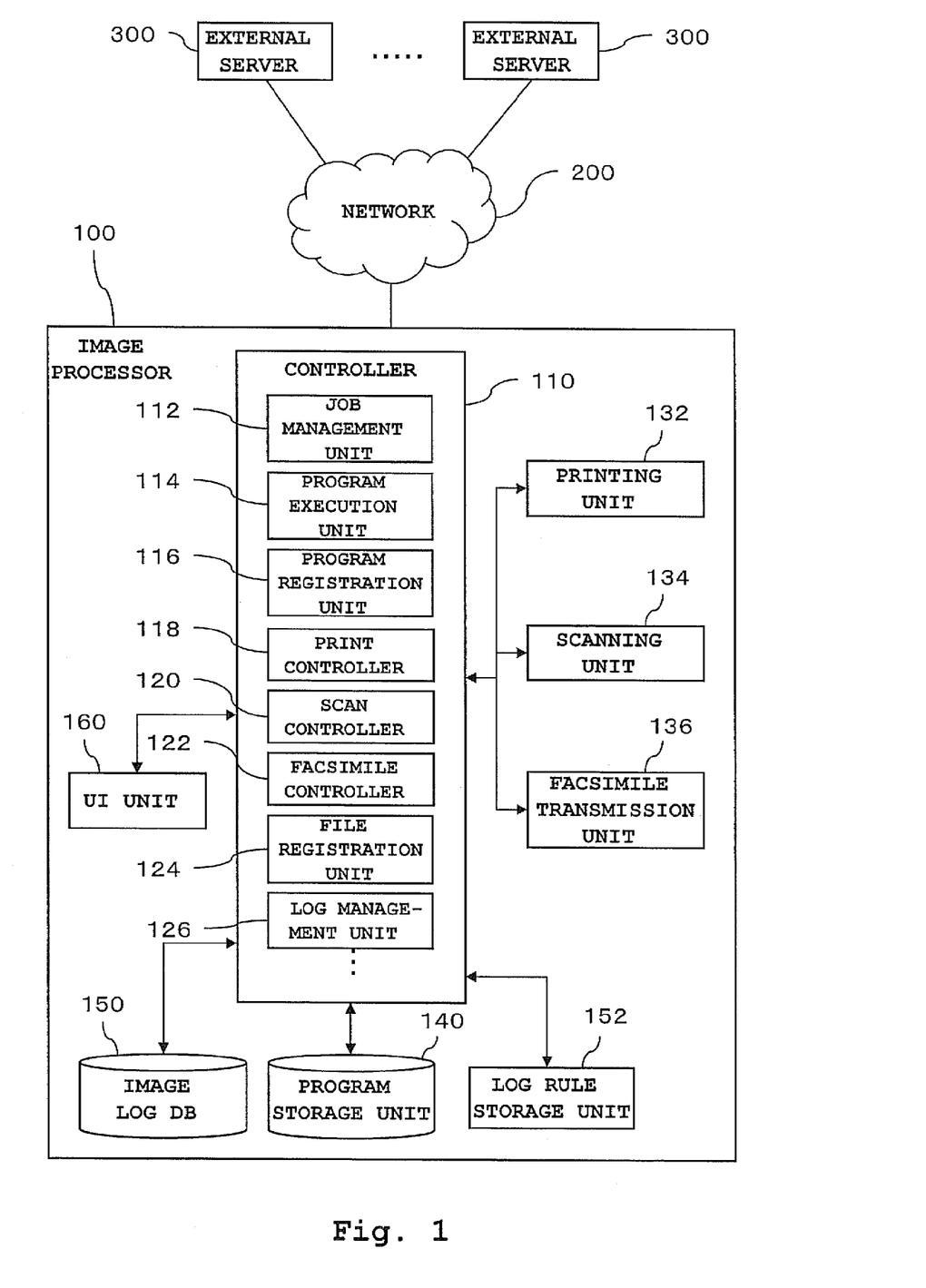
FIG. 1 shows an example configuration of an image processor according to an exemplary embodiment.

A configuration example of an image processor according to an exemplary embodiment will be described with reference to FIG. 1. In this example, an image processor 100 is exemplified as a digital multifunction machine having functions of printing, scanning (document reading), facsimile transmission, and the like. As will be obvious from the description below, the image processor 100 is not limited to such a digital multifunction machine, and may be an apparatus having at least one of image-processing functions such as printing, scanning (document reading), facsimile transmission, and various types of software image processing.

The image processor 100 according to the exemplary embodiment can provide image-processing functions of printing, scanning, facsimile transmission, and the like contained in the image processor 100, and is also capable of providing users with functions supplied from external servers 300 present on a network 200, such as the Internet or a local area network. The external servers 300 may be servers of various types, including a server that provides a service for performing optical character recognition (OCR) processing on an input image and a server that distributes an input file to a designated destination. Further, the image processor 100 is also capable of providing a cooperative service which is implemented through a combination of multiple functions provided inside or outside the image processor 100. Such a cooperative service may be a service for scanning a document and processing the scanned document through the OCR. This cooperative service is implemented by means of a scanning unit 134 in the image processor 100 as well as by means of the external server 300 that performs the OCR.

The image processor 100 has a controller 110, a printing unit 132, the scanning unit 134, a facsimile transmission unit 136, a program storage unit 140, an image log database (DB) 150, a log rule storage unit 152, and a user interface (UI) unit 160.

The printing unit 132 is an apparatus for printing an image on paper, while the scanning unit 134 is an apparatus for reading out an image formed on a paper document. The facsimile transmission unit 136 is an apparatus for performing facsimile transmission of an image. The UI unit 160 is an apparatus used by a user to operate the image processor 100, and may be hardware configured by a display and an input apparatus such as a mechanical operating button or a keyboard, or configured by a dual-purpose display and input apparatus such as a LCD (liquid crystal display) touch panel.

The program storage unit 140 stores a program in which the above-described cooperative service is described. The program for the cooperative service is configured with descriptions on various functions utilized in that service, parameters used for the functions, each execution sequence of the various functions, and the like. The functions utilized here include those provided by function modules in the image processor 100 and those provided from the external servers 300.

The image log database (DB) 150 is a database in which image logs associated with processing operations performed in the image processor 100 are accumulated. An image log information relating to an image-processing operation includes an image (a log image) used in the image-processing operation and various log items associated with the image processing. The log image may be an image input as a target to be processed or an image generated as a processed result of the image processing. The log image may be, for example, an image requested to be printed in a client apparatus (target data of printing), or an image read by the scanning unit 134.

A setting as to which of the input images or the generated images are incorporated as the log images in the image log may be defined in the image processor 100. Further, in an example, the setting may be specified for each image-processing function, and may vary from one image-processing function to another. Print data which are input as an object to be printed may be retained as a log image for the printing function, and an image to be transmitted may be retained as a log image for the facsimile transmission function. It should be understood that both the input images and the resulting processed images may be retained.

The log images are not limited to only data represented in various image formats such as a bitmap format, but may also be also data represented in any format, such as page description language, so long as the format can represent data as an image. The log items contained in the image log may include an execution date and time of the image-processing operation, a user who has instructed the processing operation, or the type of image processing having been performed.

Figure 2:
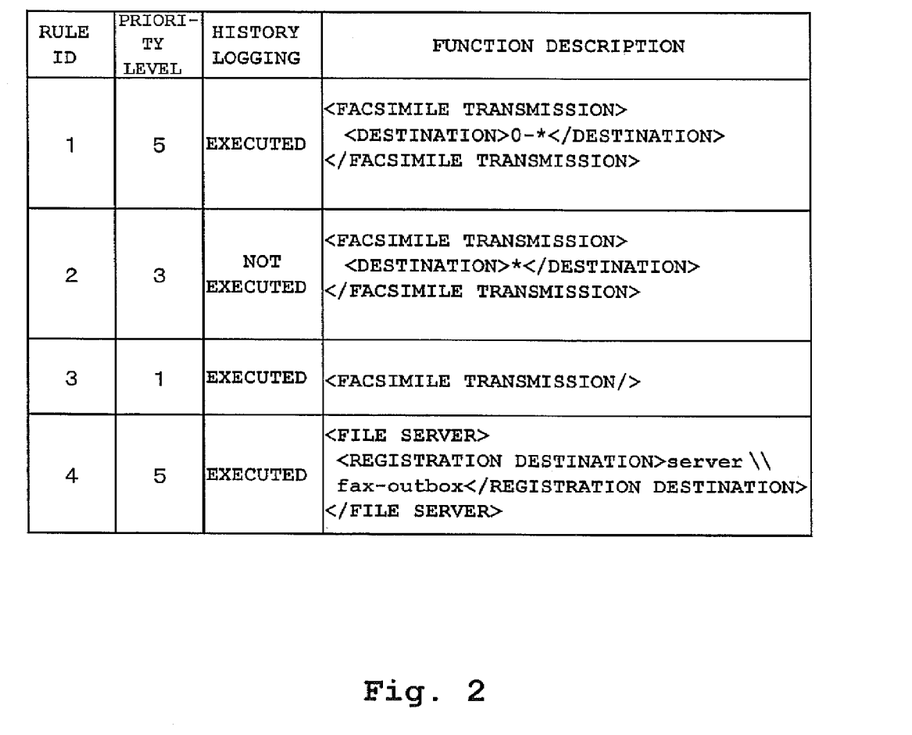
FIG. 2 shows an example of the contents of data in a log rule storage unit.

The log rule storage unit 152 stores one or more rules for defining whether or not image log data are stored. In the rules, whether or not image log data are stored is defined according to the type of an image-processing function, or, in some cases, may be defined according to both the type of an image-processing function and parameters used for executing the image-processing function. FIG. 2 shows an example of the rules stored in the log rule storage unit 152.

In the example of FIG. 2, each rule has a rule ID (identifier), a priority level, a flag that represents whether or not history logging (i.e. to store image log data) is performed, and a function description. The function description is information showing a section of description applicable to the rule in the program. This example shows the function description adapted to a program described in XML (extensible Markup Language). The function description "<facsimile transmission/>" in a rule having a rule ID of "3" (hereinafter simply referred to as "Rule 3") is a description instructing use of the facsimile transmission function. The flag associated with Rule 3 denotes "execution of history logging." According to this rule, when a program contains the tag "<facsimile transmission/>" (or a pair of tags "<facsimile transmission> and </facsimile transmission>) representing facsimile transmission, the rule is satisfied, so that history logging is determined to be "executed." Further, the function description in Rule 1 is another example of the function description including a condition for parameters in addition to the type of the image-processing function. In this example, the condition is that the parameter "destination" for the "facsimile transmission" function is a numeric string that begins with "0-" (zero followed by a hyphen). The character "*" (asterisk) in the function description can represent any character string. A facsimile transmission number beginning with zero, which is generally a number to access an outside line, satisfies the above condition. In other words, Rule 1 defines that history logging is "executed" when a destination facsimile number is the number to access an outside line. Thus, this rule may be employed when, in an office equipped with the facsimile transmission unit 136 of the image processor 100 connected to a private branch exchange, there is a desire to record images transmitted to the outside of the office. The function description in Rule 4 depicts processing for registering a file into a file server identified by an address of "server\\fax-outbox." When a program contains a description matching the above function description, an image log regarding the program is stored.

The "priority level" is a value representing an ordinal number of each rule ranked in terms of priority when there exist multiple rules defined for the same image-processing function. In this example, a rule with a higher numeral value has a higher priority level. Specifically, when a program satisfies multiple rules for the same image-processing function, a rule assigned the highest priority level is applied to the program. For example, because Rules 1 to 3 are rules defined for the same image-processing function; that is, the facsimile transmission function, all of the function descriptions of Rules 1 to 3 are satisfied when a program contains an instruction for performing facsimile transmission to a destination having the number to access an outside line. In this instance, Rule 1, which has the highest priority level, is applied. In other words, whenever a program contains the instruction for sending a facsimile toward the outside line, image log data are stored. On the other hand, when a destination which does not have the number to access an outside line is written in a description about facsimile transmission, the description about facsimile transmission satisfies both Rules 2 and 3, and Rule 2, having a higher priority level, is accordingly applied. Therefore, when facsimile transmission to an intra-company destination is instructed, image log data are not stored, in view that a risk of information leakage in intra-company facsimile transmission is low. When no value is assigned to the destination in the facsimile transmission instruction, a destination facsimile number will be input via the UI unit 160 by a user. In this case, because only Rule 3 is applicable to the facsimile transmission instruction, image log data are stored in relation to the facsimile transmission. In a case where users can freely input any destinations of facsimile transmission, image log data are retained in consideration of a higher risk of information leakage.

Explanation in relation to FIG. 1 will be resumed below. The controller 110 is a function module for performing overall control of the image processor 100, and may be configured by a microprocessor and a program executed by the microprocessor. The controller 110 includes function modules such as a job management unit 112, a program execution unit 114, a program registration unit 116, a print controller 118, a scan controller 120, a facsimile controller 122, and a file registration unit 124. The print controller 118, the scan controller 120, and the facsimile controller 122 control hardware components in the printing unit 132, the scanning unit 134, and the facsimile transmission unit 136 to implement functions of printing, reading, and facsimile transmission, respectively. The file registration unit 124 performs processing for registering a file through the network 200 into a file server which is one of the external servers 300. Although the file registration unit 124 is used as a representative example of a processing unit that issues a processing request to the external servers 300, the units other than the file registration unit 124 may issue various processing requests to the external servers 300. The job management unit 112 manages an execution sequence of various jobs, such as a print job which is input from a client apparatus on the network 200, a scan job, a facsimile job, or a program execution job instructed from the UI unit 160.

Upon receipt of an instruction from a user, the program execution unit 114 executes a program specified, by the user, from among the programs for the cooperative service stored in the program storage 140. An example of the program for the cooperative service (referred to as Program Example (1)) will be described below.

```
<scan input>
    <readout mode>monochrome</readout mode>
    <readout size>A4</readout size>
</scan input>
<distribution>
    <facsimile transmission>
        <destination>0-03-1234-5678</destination>
    </facsimile transmission>
    <file server>
        <registration destination>server\fax-outbox</registration destination>
        <user name>server\user</user name>
        <password>password</password>
        <file format>PDF</file format>
    <file server>
</distribution>
```

In the above program example, an instruction for reading an original document via a scanner is described from line 1 through line 4, and an instruction for distributing a document image converted into an electronic form by the scanner is described from line 5 through line 15.

Explanation of the scan input on lines 1 through 4 is provided first.

Line 1 is a tag that indicates the beginning of the instruction for the scan input. Line 2 specifies that a readout mode for scanning is monochrome, and line 3 specifies that a document size to be scanned is A4. Line 4 is a tag that indicates the end of the instruction for the scan input. Although several processing parameters other than the readout mode or the document size are also used for scanning, the parameters which are not explicitly specified in the program are set to default values defined in the image processor 100.

Lines 5 through 15 describe an instruction for document distribution containing two distribution instructions of document transmission via facsimile and registration into a file server. Line 5 is a tag that specifies the beginning of the document transmission instruction.

Lines 6 through 8 constitute a section specifying the document transmission via facsimile, in which line 6 is a tag that specifies the beginning of the facsimile distribution instruction. Line 7 specifies a destination telephone number of facsimile transmission. It should be noted that leading "0-" in the destination telephone number represents an access to an outside line. Line 8 is a tag that specifies the end of the instruction for the document transmission via facsimile. Parameters other than the destination described on line 7 are set to the default values.

Lines 9 through 14 constitute a section specifying registration of a document image into the file server, in which line 9 is a tag that specifies the beginning of an instruction for registration into the file server. Line 10 specifies a computer name of the file server into which the document is to be entered and a destination storage folder. Lines 11 and 12 specify a user name and a password for logging in the file server into which the document is to be entered. Line 13 specifies a format of the document to be entered. Line 14 is a tag that specifies the end of the instruction for document registration into the file server. Processing parameters for the registration into the file server other than those specified on lines 9 through 13 are set to the default values.

Line 15 is a tag that specifies the end of the document distribution instruction.

When execution of the above-described program is instructed, the program execution unit 114 operates as described below.

Upon reading the program from the start tag of the scan instruction on line 1 through the end tag of the scan instruction on line 4, the program execution unit 114 issues to the scan controller 120 an instruction for executing a scan of an original document. Here, because the program is described in XML, the start tag and the end tag of the scan instruction can be recognized as obtaining values contained between the tags. As a result, the scanning unit 134 reads out the original document.

Next, upon reading the program from the start tag of the document distribution instruction on line 5 through the end tag of the document distribution instruction on line 15, the program execution unit 114 starts preparation for document distribution in which the destination telephone number is obtained upon reading from the start tag to the end tag of the facsimile distribution instruction on lines 6 to 8. Then, the program execution unit 114 passes to the facsimile controller 122 the obtained destination telephone number and other scan parameters set to the default values defined in the image processor 100 along with the document image read by the scanning unit 134. Upon receipt of the above-described items, the facsimile controller 122 controls the facsimile transmission unit 134 to implement facsimile transmission of the document image. Further, the program execution unit 114 reads from the start tag to the end tag of the instruction for the document registration into the file server on lines 9 through 14 to obtain information for identifying an registration destination and information on the user name, the password, and the document format in addition to obtaining the default values for parameters which are not specified in the program, and passes the obtained parameters to the file registration unit 124 along with the scanned input image. Upon receipt of the parameters and the image, the file registration unit 124 registers the document image into the file server on the network 200.

Up to this point, processing details performed by the program execution unit 114 have been described by reference to the specific example. Although in the above example the program specified by the user is read out from the program storage unit 140 to run the program, the program execution unit 114 may be configured to execute a program received from an external device connected via the network 200. Next, other function modules in the controller 110 will be described. The program registration unit 116 performs processing operations to register into the program storage unit 140 a program input from a computer on the network 200 or a program generated by a user through operation of the image processor 100.

In response to a processing operation performed by each function module such as the program execution unit 114, the print controller 118, the scan controller 120, the facsimile controller 122, or the file registration unit 124, a log management unit 126 generates image log data containing a log image used in the processing and information on various log items, and stores the generated image log data in the image log DB 150. Here, information on the log items, such as a date and time or a user name, can be obtained from an operating system of the image processor 100. The log management unit 126 may be configured so as to accept, for each image-processing function (the printing unit 132, the scanning unit 134, or the facsimile transmission unit 134) in the image processor 100, a setting as to whether or not image log data are recorded. In this case, regarding each job using an individual function, such as a print job, a scan job, or a facsimile transmission job, the log management unit 126 determines, on the basis of the accepted setting, whether or not image log data are recorded in the image log DB 150.

Next will be described an example of performing control as to whether or not to register image log data relating to the program for the cooperative service performed by the program execution unit 114.

A first example is a method for including in a program for the cooperative service a description as to whether or not image log data relating to that program are needed. A program in which information representing whether or not image log data are needed is added to the above-described program example (1) is shown as program example (2) below.

```
<history logging>execution</history logging>
<scan input>
    <readout mode>monochrome</readout mode>
    <readout size>A4</readout size>
</scan input>
<distribution>
    <facsimile transmission>
        <destination>0-03-1234-5678</destination>
    </facsimile transmission>
    <file server>
        <registration destination>server\\fax-outbox</registration destination>
        <user name>server\user</user name>
        <password>password</password>
        <file format>PDF</file format>
    <file server>
</distribution>
```

In the above example, line 1 is provided to indicate whether or not image logging is required, and the description on line 1 represents that image log data should be registered. Thus, a program creator generates a program containing the description as to whether or not image logging is required, and registers the program into the program storage unit 140. The program execution unit 114 detects the description as to whether or not image logging is required in a program instructed to run. When the description is "execution," image log data including an image used for running the program are generated and registered in the image log DB 150. When the description regarding the image logging is "non-execution," the image log data are not generated. Because the above-described program is sequentially interpreted and executed from the initial element, the description representing whether or not image logging is required may be embedded at the beginning of the program in order to retain a history log regarding the entire program.

As a log image for the cooperative service, there may be used an image read out by the scanning unit 134 during execution of the cooperative service. Alternatively, image data which are input from a client apparatus as an object to be processed in the cooperative service may be recorded as the log image. Or, an image which is output from the image processor 100 as a result of the cooperative service may be recorded as the log image.

Figure 3:
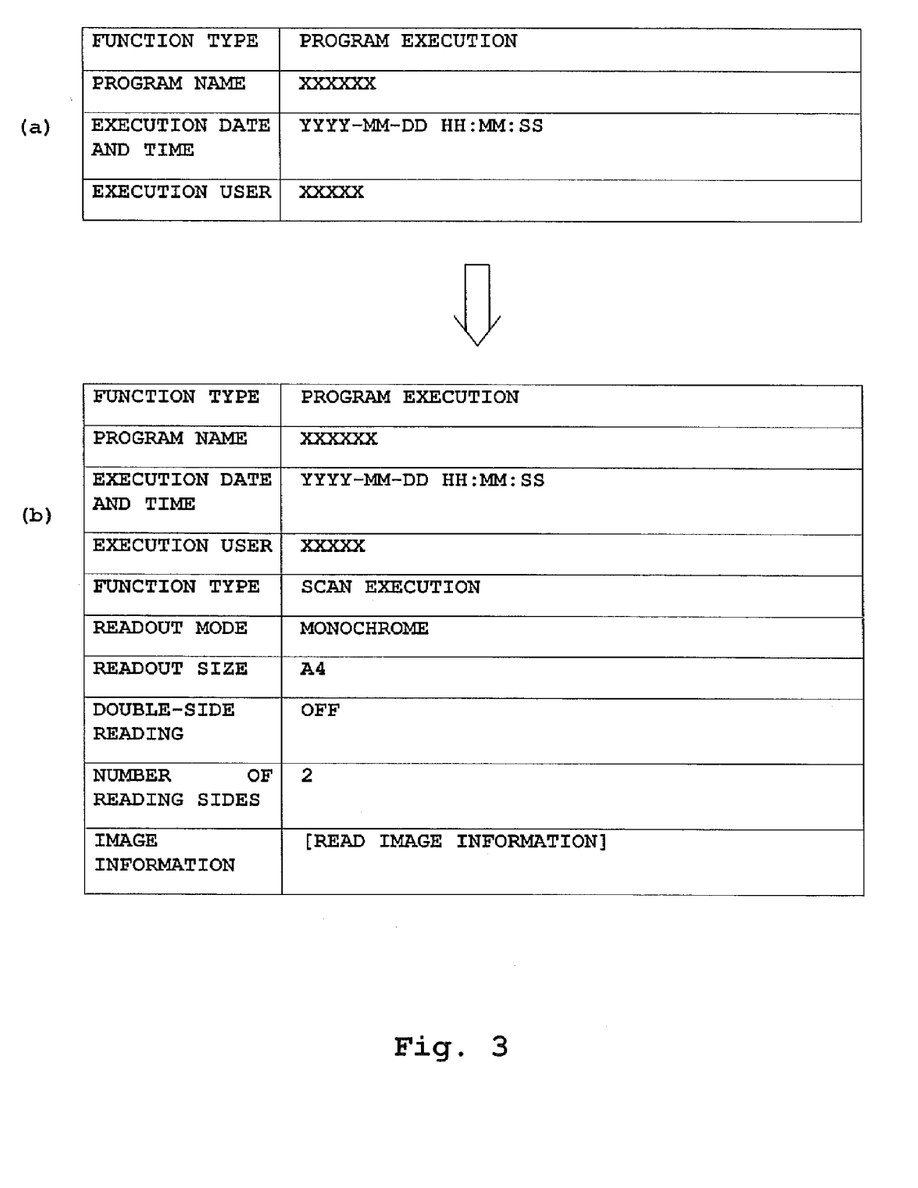
FIG. 3 is a diagram for explaining a state where an image log is constructed as processing progresses.
Figure 4:
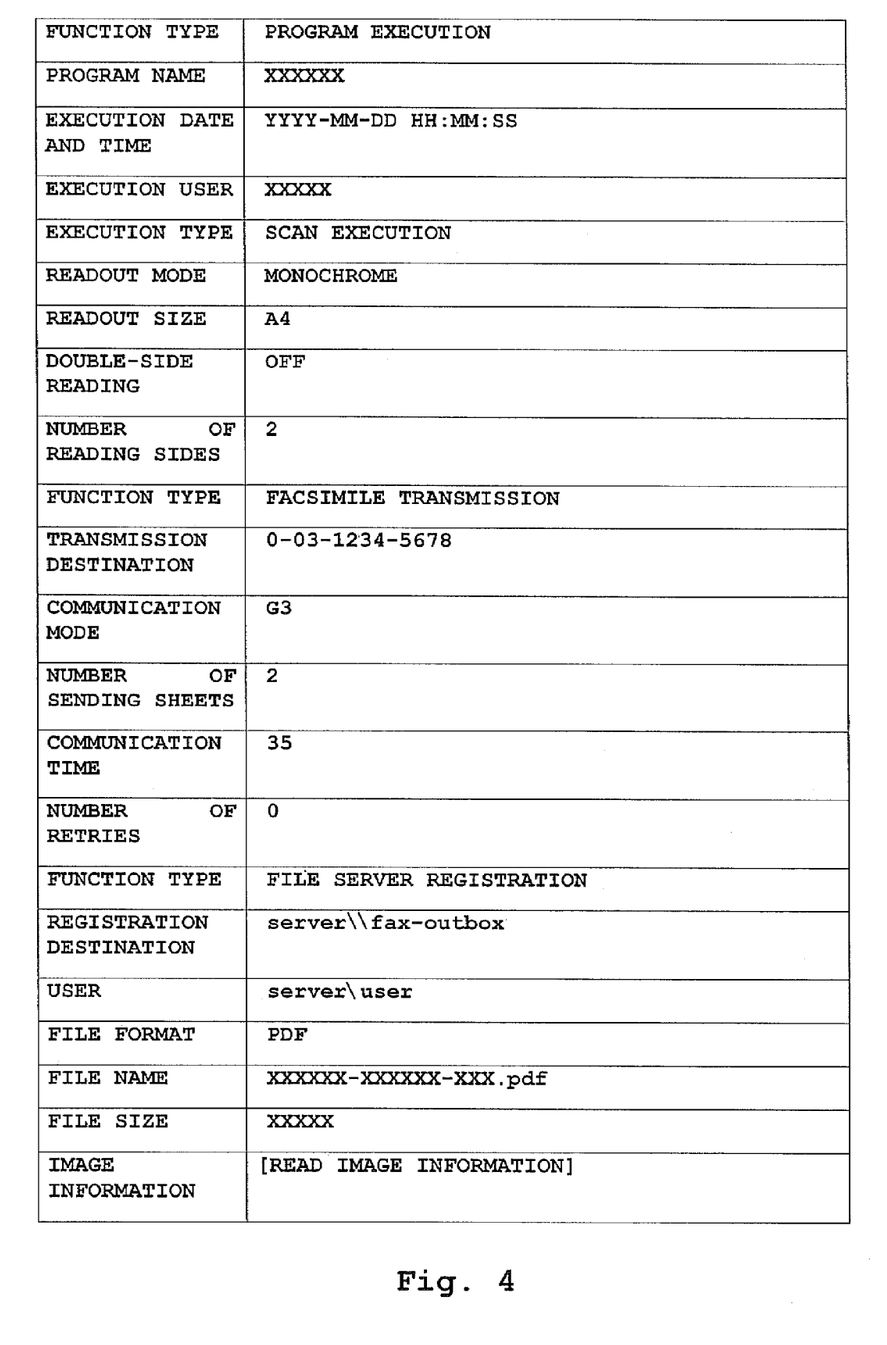
FIG. 4 shows an example of the image log.

A processing operation in which the log management unit 126 constructs an image log during program execution will be described with reference to FIGS. 3 and 4. The following description is based on the assumption that the above-described program example (2) is executed.

The program execution unit 114 reads out line 1 of the program example (2), recognizes that image logging is required, and requests the log management unit 126 to create an image log for that program. In response to the request, the log management unit 126 allocates a memory area where the image log for the program is created. The program execution unit 114 provides to the log management unit 126 information on log items associate with a program execution function. The log items associate with the program execution function include a function type of "program execution," the name of a program to be executed, a program execution date and time, and identification information of a user who has instructed execution of the program. The name of the program may be obtained from a file name of the program. Further, the execution date and time or identification information of the user may be obtained from the operating system of the image processor 100. The identification information of the user may be obtained through user authentication performed by the image processor 100. The log management unit 126 adds obtained values of the log items to the area for the image log regarding the program. At this point, the image log in the memory has data descriptions (a) shown in FIG. 3.

Then, the program execution unit 114 reads a section on lines 2 through 5 of program example (2), and passes parameters shown on lines 3 and 4 to instruct execution of a scan. Responding the instruction, the scan controller 120 performs the scan, and provides the log management unit 126 with values of log items associated with the execution of the scan together with the read image. The log management unit 126 adds the received information into the area for the image log regarding the program in the memory. At this point, the image log in the memory includes data descriptions (b) shown in FIG. 3. Among the descriptions, values of the readout mode and readout size are explicitly specified in the program, whereas values of on or off of double-side reading and the number of sides to be read are specified by default in the scan controller 120. Processing parameters of the scan controller 134 to be incorporated into the image log are predetermined in the image processor 100 (the same applies to other functions). In addition, the image received from the scan controller 120 is incorporated as a log image into an "image information" item on the final line. In this example, it is assumed that registering an image scanned by the scanning unit 134 during the program execution as the log image is predefined in the image processor 100.

Upon reading sections on lines 6 through 16 in program example (2), the program execution unit 114 instructs the facsimile controller 122 to perform facsimile transmission of the image read by the scanning, and instructs the file registration unit 124 to register the image into the file server. The facsimile controller 122 and the file registration unit 124 perform instructed respective processing operations and provide to the log management unit 126 values of the log items associated with the performed processing operations. The log management unit 126 includes the received information into the area for the image log regarding the program on the memory. At this point, the image log on the memory includes descriptions as shown in FIG. 4. In the example of FIG. 4, lines 10 through 15 are log items relating to facsimile transmission, and lines 16 through 21 are log items relating to server registration. Among the above-described items, values of items which are not described in the program are predefined default values or values to be requested when the facsimile controller 122 or the file registration unit 124 performs the processing. Here, the "image information" on the final line is an image which is read by the scanning unit 134.

When an indication as to whether or not to perform image logging placed at the beginning of the program denotes "non-execution of history logging," the program execution unit 114 instructs the log management unit 126 not to register the image log regarding the program.

When this method described in the above example is employed, the image processor 100 does not necessarily have to contain the log rule storage unit 152.

The above description has shown the example in which a program creator describes in the program a description as to whether or not the image logging is needed. As another example, there will be described a method in which the description as to whether or not image logging is needed is added into a program at the time the program is registered into the program storage unit 140. In this case, the addition of the description is performed by the program registration unit 116. In this method, the program registration unit 116 references the rules registered in the log rule storage 152 to determine whether or not image logging should be performed with respect to each image-processing function used in the program. Then, the program registration unit 116 combines the results determined for each image-processing function to comprehensively determine whether or not image log data regarding the program should be recorded.

Figure 5:
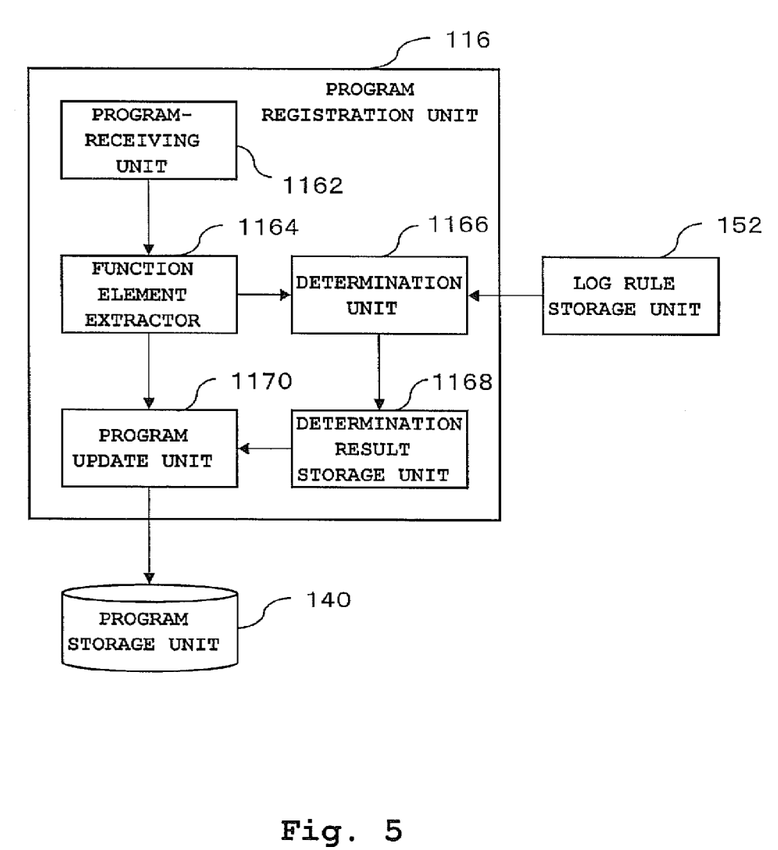
FIG. 5 shows an example of a configuration of a program registration unit in a modified example.

A functional configuration of the program registration unit 116 according to the above example is shown in FIG. 5. In the configuration of FIG. 5, a program-receiving unit 1162 receives an input program, while a function element extractor 1164 extracts individual function elements from the program. Each function element is a section describing an independent image-processing function, such as facsimile transmission or registration into a file server, which contains a description representing the type of the image-processing function, and, in some instances, also contains processing parameters of the image-processing function, as well as the type. One or more function elements are extracted from one program. The function element extractor 1164 extracts the function elements one by one and passes the extracted function elements to both a determination unit 1166 and a program update unit 1170.

The determination unit 1166 finds rules applicable to the extracted function elements from the log rule storage unit 152 on an element-by-element basis. When a description of a function element matches a function description in a certain rule, the rule is regarded as being applicable to that function element. Upon finding the rule applicable to the function element, the determination unit 1166 checks the found role for the execution or non-execution flag of history logging and the priority level. When the flag indicates "execution," the determination unit 1166 writes a description representing "history logging is executed" in a determination result storage unit 1168. Here, when multiple applicable rules are found for one function element, a rule having the highest priority level among the rules is adopted. For example, in a case where the rules shown in FIG. 2 are used, it is assumed that program example (1) is input. In this case, the function element on lines 6 through 8 representing facsimile transmission fits rules 1, 2, and 3. The program registration unit 116 applies rule 1, which is assigned the highest priority level, to the function element and writes determination of "execution of history logging" in the determination result storage unit 1168. It should be noted that a value stored in the determination result storage unit 1168 at the time when the program is input is "non-execution of history logging." When a program contains multiple function elements, and "execution of history logging" is determined for any one of the function elements in the above-described processing, "execution of history logging" is effective throughout the program.

After receiving from the function element extractor 1164 a whole program from the first line trough the final line, the program update unit 1170 obtains values stored in the determination result storage unit 1168. When the obtained value indicates "execution of history logging," the program update unit 1170 embeds in the received program a description representing execution of image logging in the form shown in the above-described program example (2). In contrast, when the value indicates "non-execution of history logging," the program update unit 1170 embeds a description representing non-execution of image logging.

Further, when "execution of history logging" is already specified in the program received at the program-receiving unit 1162, the program may be registered in the program storage 140 without performing the above-described processing.

Although the above example describes the processing in which the program is registered into the program storage 140, a way of adding the description is not limited to the above-described processing, and a computer used for creating a program may generate the program including the description representing execution or non-execution of image logging through the use of the function element extractor 1164, the determination unit 1166, the determination result storage unit 116B, the program update unit 1170, and the log rule storage unit 152.

Next will be described, as still another example, a method in which whether or not to perform image logging is determined immediately before program execution, with reference to FIG. 6.

In this method, upon receipt of an instruction for executing a program stored in the program storage 140, a function element extractor 1142 in the program execution unit 114 sequentially extracts the function elements from the first element in the program on a one-by-one basis and successively passes the extracted function elements to both a determination unit 1148 and a function element converter 1144.

Here, each of the individual image-processing functions has 0 or more processing parameters, which may include those having default values assigned thereto and those having no default value assigned thereto. The processing parameters having no default value should be assigned values by a user, unless the values are specified in the program. Accordingly, when a processing parameter for which no value specified by default or by description is found in the extracted function elements, the function element extractor 1142 causes the UI unit 160 to display an input screen for the processing parameter and prompts the user to input a value. For example, when a facsimile transmission instruction including no description of the destination telephone number is found in the program, the user is prompted to input the destination telephone number. Upon receipt of the parameter value input by the user, the function element extractor 1142 embeds the parameter value in the function element of the facsimile transmission and passes the function element to both the determination unit 1148 and the function element converter 1144.

The determination unit 1148 finds from the log rule storage unit 152 a rule applicable to the received function element. When one or more applicable rules are found, the determination unit 1148 determines whether or not image log data are recorded, according to the rule at the highest priority level selected from among the applicable rules, and subsequently registers a result of the determination into a determination result storage unit 1150. Processing operations or roles performed by or given to the determination unit 1148 and the determination result storage 1150 may be similar to those of the determination unit 1166 and the determination result storage 1168 described in the example of FIG. 5. It should be noted that because the parameters having no default value assigned thereto are provided with values input by the user in the example of FIG. 6, rule 3 in the rules of FIG. 2 is not needed in the example.

The function element converter 1144 converts the received function element into program fragments in an executable form. Specifically, when each function element in the program is described in a high-level language such as XML as shown in the above example, the function element converter 1144 converts the function element into a form executable by an execution unit 1152 such as a CPU. Hereinafter, the program described in the high-level language is referred to as an original program as distinguished from those in the executable form.

An executable program construction unit 1146 assembles conversion results of all function elements in the original program to generate a program in the executable form. Here, the executable program construction unit 1146 checks the determination results stored in the determination result storage unit 1150. When the determination of "execution of history logging" is found from the determination results, the executable program construction unit 1146 adds a program fragment representing a processing operation for recording the image log into the program in the executable form which is now being constructed. The checking of the determination result storage unit 1150 by the executable program construction unit 1146 may be performed after the conversion results of all function elements in the original program are received from the function element extractor 1142. Then, when the result of determination of "non-execution of history logging" is stored in the determination result storage unit 1150, the program fragment representing the processing of recording the image log is not added to the program in the executable form. Alternatively, a program fragment representing non-execution of the processing of image logging may be added to the program in the executable form.

Once the program in the executable form corresponding to the original program is constructed, the constructed program is passed to the execution unit 1152 and executed. When the program fragment representing the processing of recording the image log is found from the program in the executable form, the execution unit 1152 performs the processing of recording the image log according to the program fragment.

Figure 6:
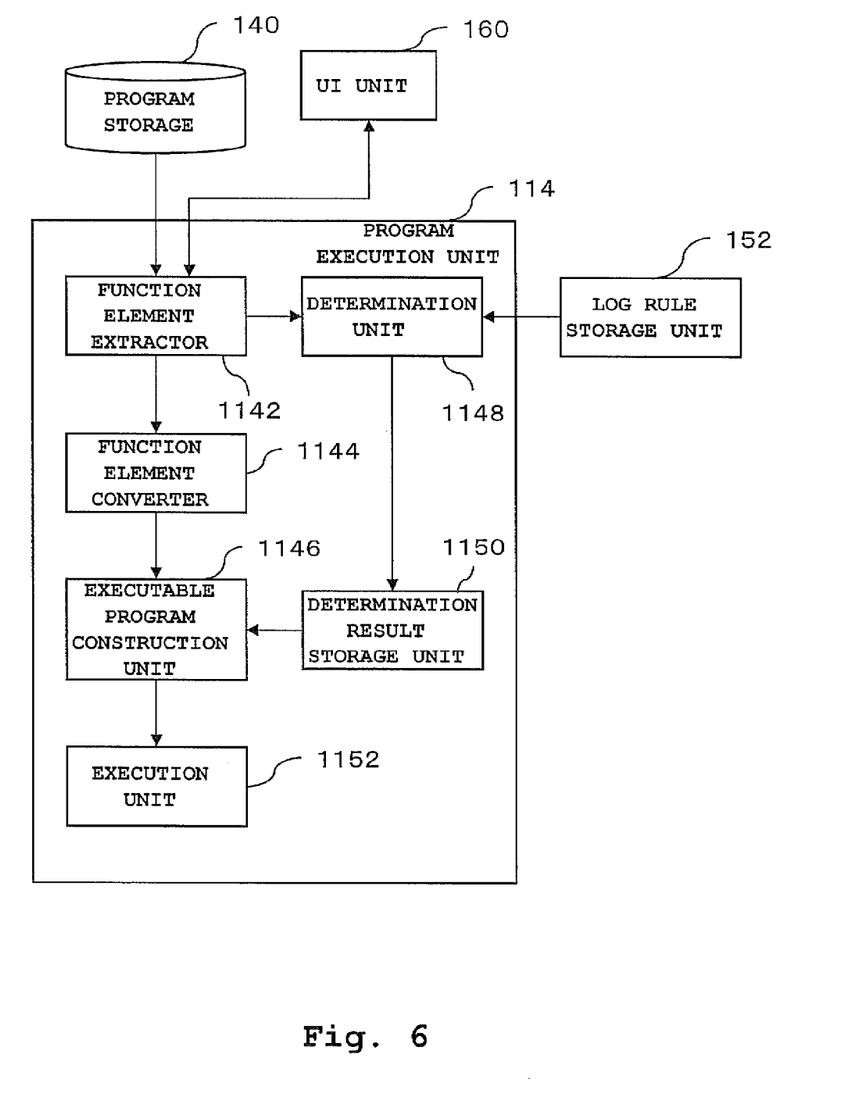
FIG. 6 shows an example of a configuration of a program execution unit in another modified example.

In the method according to the example of FIG. 6, the program registration unit 116 is required to only register the input program into the program storage 140, and does not need to have the function as described in the example of FIG. 5.

In the above-described example, when execution of the program is instructed, a determination is made by the determination unit 1148 in consideration of the parameter value input by the user. Although the rules registered in the log rule storage 152 can conceivably be revised thereafter, the determination unit 1148 performs the determination using the rules which are registered in the log rule storage unit 152 at the time of determination.

When the original program contains a description instructing the recording of image log data, the executable program construction unit 1146 may add the program fragment representing the processing of recording image log data to the program in the executable form regardless of the determination results obtained from the determination unit 1148.

Figure 7:
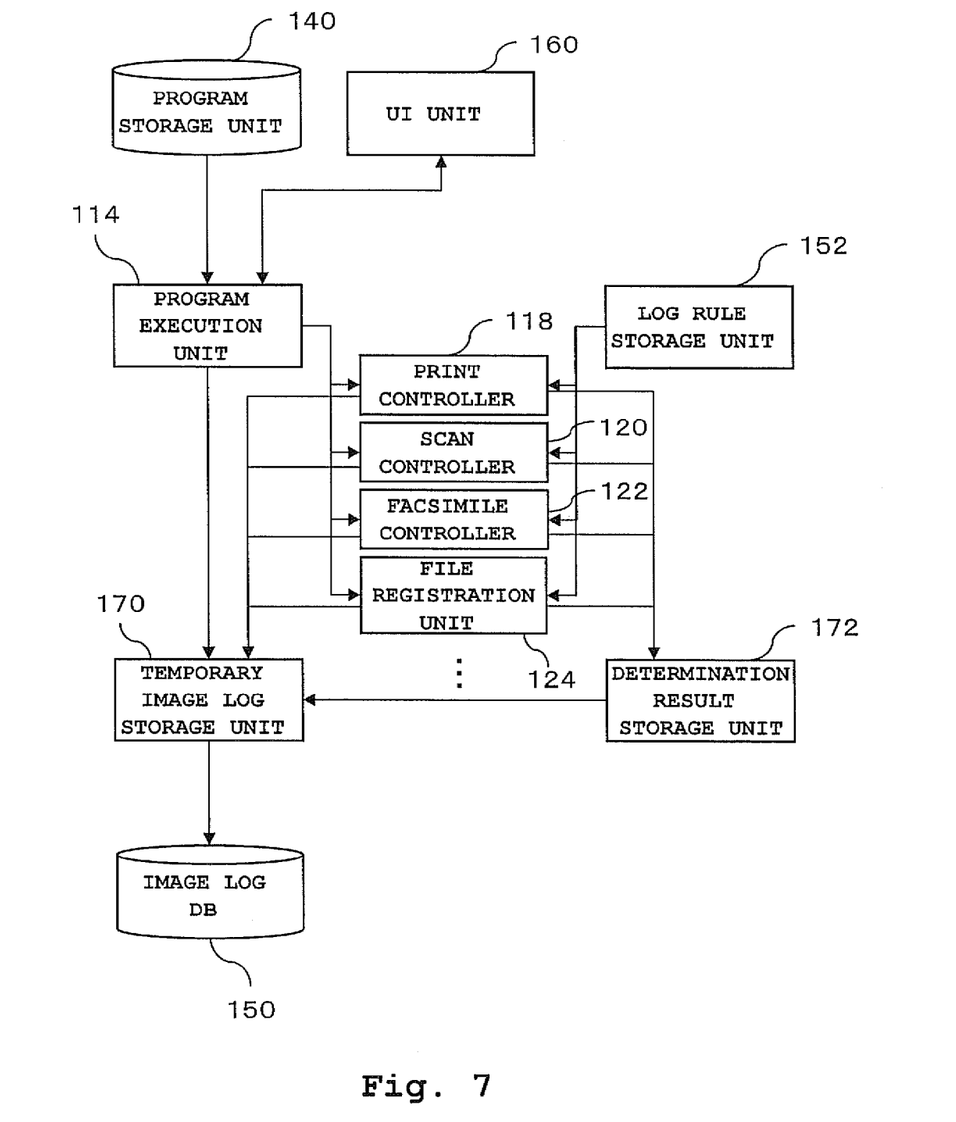
FIG. 7 shows an example of a configuration for performing control of image logging in still another example.

Next, a still further example will be described. In the example of FIG. 6, when execution of the program is instructed, whether or not image log data is recorded is determined after interpreting the program up to its end. Conversely, the execution of the program is initiated after completion of the interpretation. In contrast, a determination as to whether or not image log data are recorded is performed concurrently with the execution of the program in the example described below. An essential configuration for this example is shown in FIG. 7.

In this example, when execution of a program is instructed, the program execution unit 114 executes the program and causes each image-processing function unit, such as the print controller 118, the scan controller 120, the facsimile controller 122, or the file registration unit 124, to perform processing described in the program. Each image-processing function unit generates information on log items associated with its own processing performed by the image-processing function unit itself, and stores the generated information in a temporary image log storage 170. The temporary image log storage unit 170 may be a storage area allocated, for example, in a main memory. In addition, upon finding rules applicable to its own processing in the log rule storage unit 152, the image-processing function unit determines whether or not image log data are recorded, according to the rule at the highest priority level selected from among the found rules, and writes the determination result in a determination result storage unit 172. A value of the determination result to be stored in the determination result storage unit 172 is set to an initial value "non-execution of history logging" at the time when the program is started. When any one of the image-processing function units once overwrites the initial value with a value "execution of history logging" during execution of the program, the value of "execution of history logging" is maintained thereafter, even if another one of the image-processing function units subsequently determines a result of "non-execution of history logging."

Upon completion of execution of the program, an image log corresponding to the executed program is constructed in the temporary image log storage unit 170. At this point, if the value in the determination result storage unit 172 is "execution of history logging," the program execution unit 114 registers, into the image log DB 150, the image log contained in the temporary image log storage unit 170. Otherwise, the image log contained in the temporary image log storage unit 170 is abandoned without registration into the image log DB 150.

Because the image-processing function units in this example partially play the role of the log management unit 126 in the previous example, the log management unit 126 may be omitted.

In the example of FIG. 7, each one of the image-processing function units determines whether or not image log data are recorded using parameter values acquired at the point in time when the image-processing function unit performs its own processing.

There may be a case where one image-processing function unit uses information generated through processing performed by another processing unit as a processing parameter, and a value of the processing parameter is utilized as a judgment material in a rule for determining whether or not image log data are registered. Because the value of such a processing parameter has been defined by the time when the image-processing function unit starts its processing, the image-processing function unit may conduct determination based only on the value.

The method according to the example of FIG. 7 may be also applied when the program registered in the program storage unit 140 is in the executable form.

As a still further example, a method as described below may be used. In this method, the program registration unit 116 analyzes the description in an input program, creates a list of image-processing functions used in the input program, and registers, in the program storage unit 140, a renewed version of the program in which the list is included. Upon receipt of an instruction for execution of the program, the program execution unit 114 records image log data so long as the need for recording image log data is determined for even one of the image-processing functions contained in the list. It should be noted that the rules stored in the log rule storage unit 152 in this case may be information in which whether or not image log data should be recorded is defined for each image-processing function.

Figure 8:
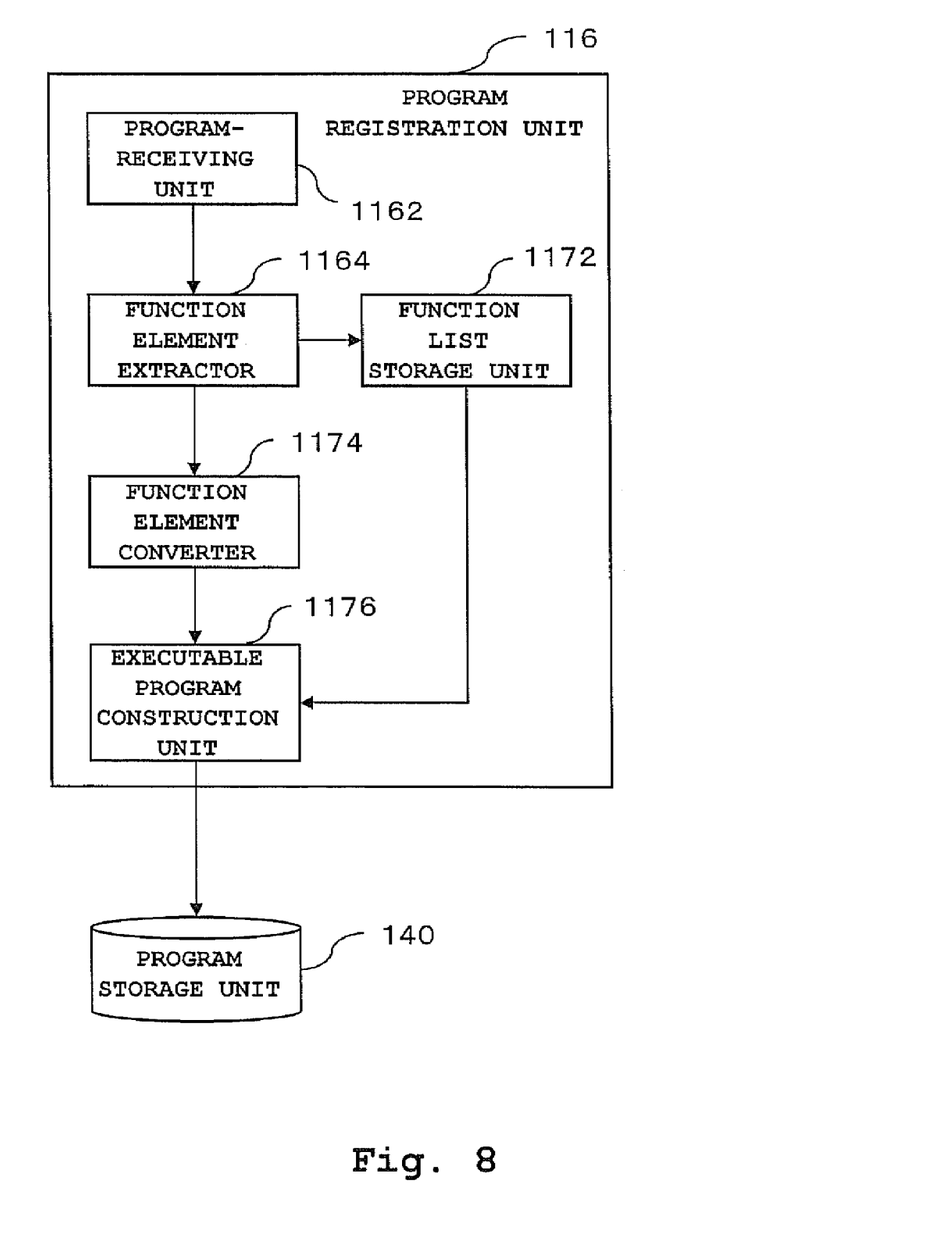
FIG. 8 shows an example of a configuration of the program registration unit in still another modified example.

Specifically, in this example, the original program received in the program-receiving unit 1162 as shown in FIG. 8 is divided by the function element extractor 1164 into function elements which are then converted into an executable program in an executable program construction unit 1176. A function element converter 1174 and the executable program construction unit 1176 may be those capable of performing functions similar to the function element converter 1144 and the executable program construction unit 1146 used in the example of FIG. 6, respectively.

In the process of the above-described conversion, information on each function element extracted by the function element extractor 1164 is stored in a function list storage unit 1172.

The executable program construction unit 1176 includes in the executable program fragments generated in the function element converter 1174 both an information list of the function elements obtained from the function list storage unit 1172 and a program fragment for determining whether or not image log data are recorded with reference to the information list of the function elements, to thereby construct an executable program, and registers the constructed executable program into the program storage unit 140.

When a user instructs execution of the program stored in the program storage 140 unit, the program execution unit 114 executes the program. Then, the program execution unit 114 references the information list of function elements contained in the program and the rules stored in the log rule storage unit 152 to determine whether or not image logging is performed, and thereafter performs the function described in the program.

Although execution or non-execution of image logging is controlled such that execution or non-execution of recording is determined for image log data including the log items such as a processing date and time in addition to the log image taking the image log data as one unit, the control of image logging is not limited to this manner. For example, execution or non-execution of image logging may be controlled with respect to only the log image, and all the log items such as the processing date and time may be always recorded without controlling.

Figure 9:
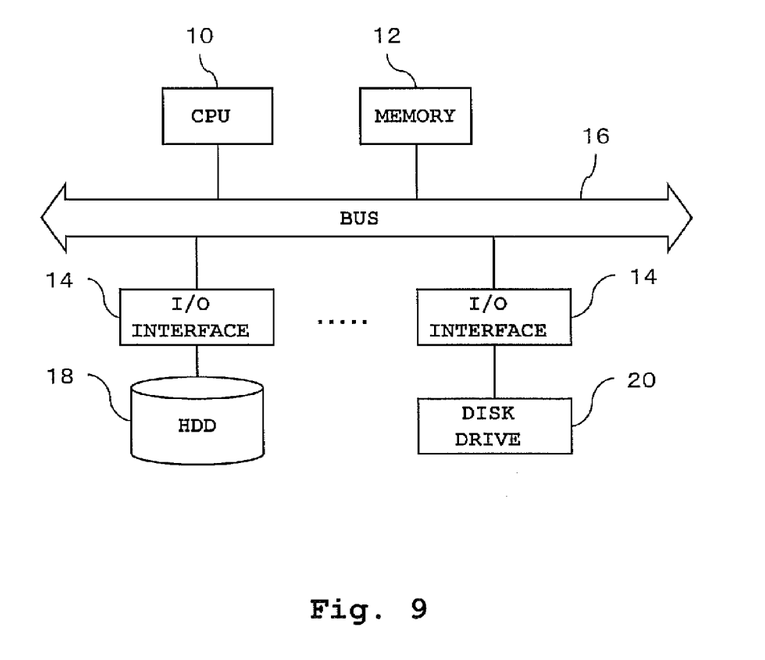
FIG. 9 shows an example of a hardware configuration in a computer.

The controller 110 in the image processor 100 exemplified in the above description is typically implemented by executing, in a general-purpose computer, a program in which a function or processing details of each of the above-described components are described. The computer may have a circuit configuration in which, as shown in FIG. 9, hardware components of a CPU (central processing unit) 10 such as a microprocessor, a memory (temporary storage unit) 12 such as a random access memory, various I/O (input/output) interfaces 14, and other elements are connected via a bus 16. Further, the bus 16 may be connected via the I/O interfaces 14 to a hard disk drive 18, a disk drive 20 used for reading from and/or writing onto a CD or a DVD, a device for reading from and/or writing onto a portable non-volatile recording medium according to various specifications such as a flash memory, and other components. A program in which the processing details according to the exemplary embodiment are described is stored via a recording medium, such as a CD or a DVD, or via a network into a fixed storage unit such as the hard disk drive 18 and installed in the computer. The processing described in the exemplary embodiment is realized by reading out the program stored in the fixed storage unit into the memory 12 and executing the program by means of the CPU 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An image log management apparatus comprising:
a rule storage unit that stores a rule for determining whether or not a log image is recorded at a time when each processing operation is performed by one or more image-processing units according to a program in which a procedure for using the one or more image-processing units is described, the program including one or more function descriptions, each of which defines a type of an image-processing function performed by the one or more image-processing units and a destination of image data the rule being used to determine, based on a combination of the type and the destination of image data defined in a function description in the program, whether or not the function description serves as an indication to perform log image recording, the rule including a priority level defining an ordinal number of each rule ranked in terms of priority when there exists multiple rules for each image-processing function, when the procedure satisfies the multiple rules for each image-processing function, the rule assigned the highest priority level is applied to the program;
an acceptance unit that accepts the program in which the procedure for using the one or more image-processing units is described;

a program execution unit that executes the program accepted in the acceptance unit; and a log controller that records a log image relating to execution of the program in the program execution unit when the function description being determined by the rule as an indication to perform log image recording is included in the program executed by the program execution unit, wherein the program contains an instruction to perform a plurality of image-processing functions, the log controller determines whether or not recording of the log image is needed according to the rule for each of the plurality of image-processing functions, and when the recording is determined to be needed for at least one of the plurality of image processing functions, even if the recording of another one or more of the image-processing functions is determined to be needed, the recording of the log image for the program is performed.

2. The image log management apparatus according to claim 1, wherein the rule storage unit stores, as the rule applicable to each of the image-processing units, a rule including a condition for a processing parameter, and the log controller performs the control based on both the processing parameter for the image-processing unit used in the program and the rule applicable to the image-processing unit.

3. The image log management apparatus according to claim 2, wherein the log controller performs the control based on a processing parameter for the image-processing unit dynamically obtained during the execution of the program in the execution unit.

4. The image log management apparatus according to claim 1, further comprising:

a program storage unit that stores one or more programs selectable as an object to be executed by the program execution unit; an a program registration unit that analyzes a description in an input program to find one or more image-processing units used in the program, determines, based on each rule applicable to the one or more image-processing units, whether or not the log image relating to the execution of the program should be recorded, embeds into the program a log control description responding to a determination result, and registers the program including the embedded log control description into the program storage unit;

wherein the log controller performs the control according to the log control description embedded in the program which is instructed to be executed.

5. The image log management apparatus according to claim 1, wherein the image-processing function is an image transmission processing function, and the parameter of the image-processing function is a destination of image transmission.

6. The image log management apparatus according to claim 1, wherein when one or more rules applicable to the function description are found, determination as to whether or not to record the log image is based according to the rule having highest priority.

7. A non-transitory computer-readable recording medium storing a program causing a computer to execute a process for controlling image logging, the process comprising:

executing a program in which a procedure for using one or more image-processing units is described, the program including one or more function descriptions, each of which defines a type of an image-processing function performed by the one or more image-processing units and a destination of image data the rule being used to determine, based on a combination of the type and the destination of image data defined in a function description in the program, whether or not the function description serves as an indication to perform log image recording, the rule including a priority level defining an ordinal number of each rule ranked in terms of priority when there exists multiple rules for each image-processing function, when the procedure satisfies the multiple rules for each image-processing function, the rule assigned the highest priority level is applied to the program, recording a log image relating to execution of the program in the program execution unit being recorded when the function description being determined by the rule as an indication to perform log image recording is included in the program executed by the program execution unit, wherein the program contains an instruction to perform a plurality of image-processing functions, and determining whether or not recording of the log image is needed according to the rule for each of the plurality of image-processing functions, and when the recording is determined to be needed for at least one of the plurality of image processing functions, even if the recording of another one or more of the image-processing functions is determined to be needed, the recording of the log image for the program is performed.

8. The non-transitory recording medium according to claim 7, wherein the rule applicable to each of the image-processing units is a rule including a condition for a processing parameter; and the performing control as to whether or not a log image is recorded comprises performing the control based on both a processing parameter for the image-processing unit used in the program and the rule applicable to the image-processing unit.

9. The non-transitory recording medium according to claim 8, wherein the performing control as to whether or not a log image is recorded comprises performing the control based on a processing parameter for the image-processing unit dynamically obtained during execution of the program.

10. The non-transitory recording medium according to claim 7, wherein the process further comprises:

storing one or more programs selectable as an object to be executed by a program execution unit;

analyzing a description in an input program to find an image-processing unit used in the input program;

based on a rule applicable to the found image-processing unit, determining whether or not recording a log image relating to execution of the input program is needed;

embedding, in the input program, a log control description responding to a determination result of the determination;

registering in a program storage unit the program including the embedded log control description; and executing a program selected to be executed from among the programs registered in the program storage unit, wherein, in the performing control as to whether or not the log image is recorded, the control is performed according to the log control description contained in the program selected to be executed.

11. The non-transitory recording medium according to claim 7, wherein the image-processing function is an image transmission processing function, and the parameter of the image-processing function is a destination of image transmission.

12. The non-transitory recording medium according to claim 7, wherein when one or more rules applicable to the function description are found, determination as to whether or not to record the log image is based according to the rule having highest priority.

13. A non-transitory computer-readable medium storing a program causing a computer to execute a process for controlling image logging, the process comprising:

accepting a program in which a procedure for using one or more image-processing units is described;

executing the accepted program; and when a processing operation according to a program in which a procedure for using one or more image-processing units is described is performed in each of the image-processing units, referencing a rule storage that stores a rule for determining whether or not a log image is recorded where the program including one or more function descriptions, each of which defines a type of an image-processing function performed by the one or more image-processing units and a destination of image data the rule being used to determine, based on a combination of the type and the destination image data defined in a function description in the program, whether or not the function description serves as an indication to perform log image recording, to thereby record a log image relating to execution of the program in the program execution unit being recorded when the function description being determined by the rule as an indication to perform log image recording is included in the program executed by the program execution unit, the rule including a priority level defining an ordinal number of each rule ranked in terms of priority when there exists multiple rules for the same image-processing function, when the procedure satisfies the multiple rules for the same image-processing function, the rule assigned the highest priority level is applied to the program, wherein the program contains an instruction to perform a plurality of image-processing functions, a log controller determines whether or not recording of the log image is needed according to the rule for each of the plurality of image-processing functions, and when the recording is determined to be needed for at least one of the plurality of image processing functions, even if the recording of another one or more of the image-processing functions is determined to be needed, the recording of the log image for the program is performed.

14. The non-transitory recording medium according to claim 13, wherein the image-processing function is an image transmission processing function, and the parameter of the image-processing function is a destination of image transmission.

15. The non-transitory recording medium according to claim 13, wherein when one or more rules applicable to the function description are found, determination as to whether or not to record the log image is based according to the rule having highest priority.

16. A method for managing an image log comprising:

executing a program in which a procedure for using one or more image-processing units is described, the program including one or more function descriptions, each of which defines a type of an image-processing function performed by the one or more image-processing units and a destination of image data the rule being used to determine, based on a combination of the type and the destination of image data defined in a function description in the program, whether or not the function description serves as an indication to perform log image recording, the rule including a priority level defining an ordinal number of each rule ranked in terms of priority when there exists multiple rules for the same image-processing function, when the procedure satisfies the multiple rules for the same image-processing function, the rule assigned the highest priority level is applied to the program, recording a log image relating to execution of the program in the program execution unit being recorded when the function description being determined by the rule as an indication to perform log image recording is included in the program executed by the program execution unit, wherein the program contains an instruction to perform a plurality of image-processing functions, and determining whether or not recording of the log image is needed according to the rule for each of the plurality of image-processing functions, and when the recording is determined to be needed for at least one of the plurality of image processing functions, even if the recording of another one or more of the image-processing functions is determined to be needed, the recording of the log image for the program is performed.

17. A method according to claim 16, wherein the image-processing function is an image transmission processing function, and the parameter of the image-processing function is a destination of image transmission.

18. A method according to claim 16, wherein when one or more rules applicable to the function description are found, determination as to whether or not to record the log image is based according to the rule having highest priority.

* * * * *